US008817786B2

(12) United States Patent
Kassi-Lahlou et al.

(10) Patent No.: US 8,817,786 B2
(45) Date of Patent: Aug. 26, 2014

(54) METHOD FOR FILTERING PACKETS COMING FROM A COMMUNICATION NETWORK

(75) Inventors: Mohamed Kassi-Lahlou, Fontaine Etoupefour (FR); Jade Mansour, Bagneux (FR); Jean-Charles Michel, Paris (FR)

(73) Assignee: France Telecom, Paris (FR)

( * ) Notice: Subject to any disclaimer, the term of this patent is extended or adjusted under 35 U.S.C. 154(b) by 165 days.

(21) Appl. No.: 12/214,986

(22) Filed: Jun. 23, 2008

(65) Prior Publication Data

US 2009/0097488 A1    Apr. 16, 2009

(30) Foreign Application Priority Data

Jun. 22, 2007 (FR) ..................................... 07 55944

(51) Int. Cl.
*H04L 12/28* (2006.01)
*H04L 29/06* (2006.01)
*H04W 12/00* (2009.01)
*H04W 80/04* (2009.01)

(52) U.S. Cl.
CPC ........... *H04L 63/0254* (2013.01); *H04W 80/04* (2013.01); *H04W 12/00* (2013.01)
USPC .............................. 370/392; 370/397; 370/399

(58) Field of Classification Search
CPC ..................... H04L 29/0653; H04L 29/06095; H04L 49/3009; H04L 49/309; H04L 45/74
USPC .............. 370/338, 401, 329, 352, 395.3, 392, 370/397, 395.31, 399
See application file for complete search history.

(56) References Cited

U.S. PATENT DOCUMENTS

| 2003/0079144 | A1* | 4/2003 | Kakemizu et al. | 713/200 |
|---|---|---|---|---|
| 2004/0117473 | A1* | 6/2004 | Yamamura et al. | 709/223 |
| 2005/0071650 | A1* | 3/2005 | Jo et al. | 713/188 |
| 2005/0165917 | A1 | 7/2005 | Le et al. | |
| 2005/0265276 | A1* | 12/2005 | Takeda et al. | 370/328 |
| 2006/0059551 | A1* | 3/2006 | Borella | 726/13 |
| 2006/0114924 | A1* | 6/2006 | Yazaki et al. | 370/428 |
| 2006/0185012 | A1 | 8/2006 | Olivereau | |
| 2007/0248078 | A1* | 10/2007 | Gundavelli et al. | 370/352 |

OTHER PUBLICATIONS

A. Inoue et al., "IP Layer Security and Mobility Support Design Policy and an Implementation", ISS '97, World Telecommunications Congress, International Switching Symposium, vol. 1, pp. 571-577, Sep. 21, 1997.

* cited by examiner

*Primary Examiner* — Hassan Phillips
*Assistant Examiner* — Siren Wei
(74) *Attorney, Agent, or Firm* — Cozen O'Connor

(57) ABSTRACT

A method of filtering packets coming from a communication network (1) comprising, after successful registration of a terminal (20) with a service platform (32): a step of associating a registration context with the terminal, the context comprising registration information transmitted between the terminal and the service platform during registration; a step of creating at least one filtering rule on the basis of the registration context, said rule aiming to block packets that do not conform to at least a portion of the registration information; and a step of filtering the packets as a function of the rule created.

7 Claims, 3 Drawing Sheets

|  | IP source | IP destination | Protocol/port |
|---|---|---|---|
| R1 | NAI valid | IP HA | Mobile IP<br>udp 434 dst<br>udp 435 dst |
| R1r | IP HA | NAI valid | Mobile IP<br>udp 434 src<br>udp 435 src |
| R2 | CoA | IP HA | IPinIP<br>IP/4 |
| R2r | IP HA | CoA | IPinIP<br>IP/4 |
| R3 | HoA | any | any |
| R3r | any | HoA | any |

|  | IP source | IP destination | Protocol/port |
|---|---|---|---|
| R1 | NAI valid | IP HA | Mobile IP udp 434 dst udp 435 dst |
| R1r | IP HA | NAI valid | Mobile IP udp 434 src udp 435 src |
| R2 | CoA | IP HA | IPinIP IP/4 |
| R2r | IP HA | CoA | IPinIP IP/4 |
| R3 | HoA | any | any |
| R3r | any | HoA | any |

METHOD FOR FILTERING PACKETS COMING FROM A COMMUNICATION NETWORK

RELATED APPLICATION

This application claims the priority of French application Ser. No. 07/55944 filed Jun. 22, 2007, the entire content of which is hereby incorporated by reference.

FIELD OF THE INVENTION

The invention relates to a technique for filtering packets coming from a communication network.

The field of the invention is that of protecting a service platform by means of a security device, commonly called a firewall, inserted between the service platform and a communication network.

BACKGROUND OF THE INVENTION

Such services can be terminal IP mobility management services, for example. The Mobile IP protocol is used to manage the mobility of a mobile terminal, also known as a Mobile IP Node (MN), from a home IP subnetwork to another IP subnetwork, referred to as the visited network, during movement of the node.

A visited network can offer roaming visitor nodes acquisition of an IP address that is valid at the topology level. To this end a Foreign Agent (FA) function can be provided on a given equipment in the visited network to register visitor mobile nodes and to offer functions for retransmission of packets to them. When a node moves to a visited network comprising a foreign agent FA, it acquires from the foreign agent FA a temporary address in that visited network, commonly referred to as a Care-of Address (CoA). A single temporary address can be used for all visitor nodes. The mobile node MN roaming in the visited network is then registered with a referent equipment of its home IP network, whose function is IP mobility management, and sends it the temporary address in the visited network. This kind of referent equipment is commonly called a Home Agent (HA). All IP nodes have or obtain, upon registering with their home agent, a Home Address (HoA) in their home IP network. The home agent stores the correspondence between the address HoA in the home network and the temporary address CoA in the visited network. The mobile node MN roaming in the visited network can therefore receive at the temporary address CoA packets sent to the address HoA in the home network. It can also send packets from the temporary address CoA so that they seem to have been sent from the address HoA in the home network.

In a visited network that does not include a foreign agent FA, the mobile node acquires a personal temporary address in the visited network known as the Co-Located Care of Address (CCoA) and registration with the home agent is carried out as described above.

To prevent packets transmitted from the visited network by the roaming node being rejected because of a source IP address considered to be incorrect in the visited network, a tunnel can be established between the foreign agent FA and the home agent HA or between the roaming node and the home agent if the visited network has no foreign agent FA. Packets transmitted by the mobile node MN are then transmitted to the home agent HA in the tunnel. The home agent HA is then responsible for transmitting them to the addressee.

The referent equipment or home agent is conventionally protected by a firewall. The firewall applies predefined filtering rules to block at least some undesirable incoming traffic. These rules are generic and aim to filter in particular incoming traffic from a given communication network. They allow the selective passage of certain streams of data. The following rules may be cited by way of illustrative example:

a first rule accepts registration requests from a valid IP network going to the home agent;

a second rule accepts traffic corresponding to packets transmitted in a tunnel from a valid IP address to the home agent;

a third rule accepts traffic going to an address in the home network that is one of a set of addresses managed by the referent equipment.

It is nevertheless possible for a malicious equipment to circumvent these rules and to use valid parameters, in particular to attack the home agent.

OBJECTS AND SUMMARY OF THE INVENTION

One object of the invention is to improve the protection of a referent equipment.

One aspect of the invention is directed to a method of filtering packets coming from a communication network comprising, after successful registration of a terminal with a service platform:

a step of associating a registration context with the terminal, the context comprising registration information transmitted between the terminal and the service platform during registration;

a step of creating at least one filtering rule on the basis of the registration context, said rule aiming to block packets that do not conform to at least a portion of the registration information;

a step of filtering the packets as a function of the rule created.

Thus, specific filtering rules can be created dynamically as a function of the terminals registered with the service platform. The rules being created on the basis of a registration context including registration information, they are adapted to traffic liable to come from a communication network. The registration context and the associated rules are created only in the event of successful registration with the service and the context takes account of information obtained both from the registration request transmitted by the terminal and the response from the service platform sent to the terminal. Thus, if a parameter is assigned to the terminal only when it has been successfully registered, the method updates the registration context as a function of that new parameter.

The method can be implemented to protect service platforms such as a terminal IP mobility management services, an IMS multimedia service, an authentication service. It is particularly well suited to the mobility management service in that the mobility management platform participates in the routing of packets coming from and going to a roaming terminal once the terminal has been registered.

The method further comprises, before the step of filtering packets as a function of the rule created, a filtering step in which messages defined by a given protocol and comprising an invalid service identifier sent to the service platform are blocked.

A generic filtering rule is applied to all messages using a given protocol. Thus registration requests to the service platform are blocked if they do not include a valid service identifier. In the prior art previously discussed, registration requests are filtered as a function of a valid source IP address. This necessitates complex declarations and requires regular updates. Furthermore, the platform is not protected if an attacker uses an authorized IP address. Also, this necessitates that the terminal, which is a client of the service, obtain a valid IP address before joining the service platform. For the mobility management service, if it is required to limit the set of addresses allocated to that service, for example, it is preferable to be able to allocate an address in the home network only if the terminal seeks to use the service. Thus the terminal requests to be registered by transmitting to the mobility management service its identifier in respect of that service and receives in return an address in the home network. That address is used by incoming terminals in contact with the roaming terminal. The method creates the registration context from registration information contained in the registration request and also in the response. Thus specific well adapted rules are obtained and are used to filter incoming traffic to the service platform very efficiently.

Moreover, a time-to-live associated with registration with the service platform is associated with the filtering rule created, after which said rule is eliminated.

As a general rule, a validity period is included in the registration messages exchanged. Thus by storing this registration time-to-live information in the registration context, specific filtering rules that are no longer of any utility are eliminated, the registration of the terminal having expired.

In one embodiment, the service platform manages the mobility of at least one terminal belonging to a home network to visited networks and the registration context includes an address of the terminal in the home network, the step of creating a filtering rule being adapted to block packets not sent from the address of the terminal in the home network.

Furthermore, the registration context further comprising a temporary address of the terminal in a visited network, another filtering rule is created from the registration context, said other rule being adapted to block encapsulated packets that do not include the temporary address of the terminal by way of a home address.

If a tunnel is established between the roaming terminal and the home agent HA, the packets are sent in encapsulated form from the temporary address of the roaming terminal to the service platform, and vice-versa. Thanks to the other specific rule created that is associated with the context, protection of the service platform is also improved.

Another aspect of the invention is directed to an entity for filtering packets coming from a communication network, adapted to protect a service platform, comprising:

means for associating a registration context with a terminal, following successful registration of the terminal with the service platform, the context comprising registration information transmitted between the terminal and the service platform during registration;

means for creating at least one filtering rule on the basis of the registration context, said rule aiming to block packets that do not conform to at least a portion of the registration information;

means for filtering the packets as a function of the rules created.

Another aspect of the invention is directed to a service provider system comprising:

a service platform adapted to provide a service to terminals of a home network, and a filtering entity as defined above, adapted to receive packets coming from a communication network and to filter them before transfer to the service platform.

Other aspects of the invention are directed to:

a program for an entity for filtering packets coming from a communication network, comprising program code instructions for commanding execution of the steps of the method as defined above when said program is executed by said entity, and a storage medium readable by an entity on which the program for a packet filtering entity as defined hereinabove is stored.

DETAILED DESCRIPTION OF THE DRAWINGS

Figure 1:
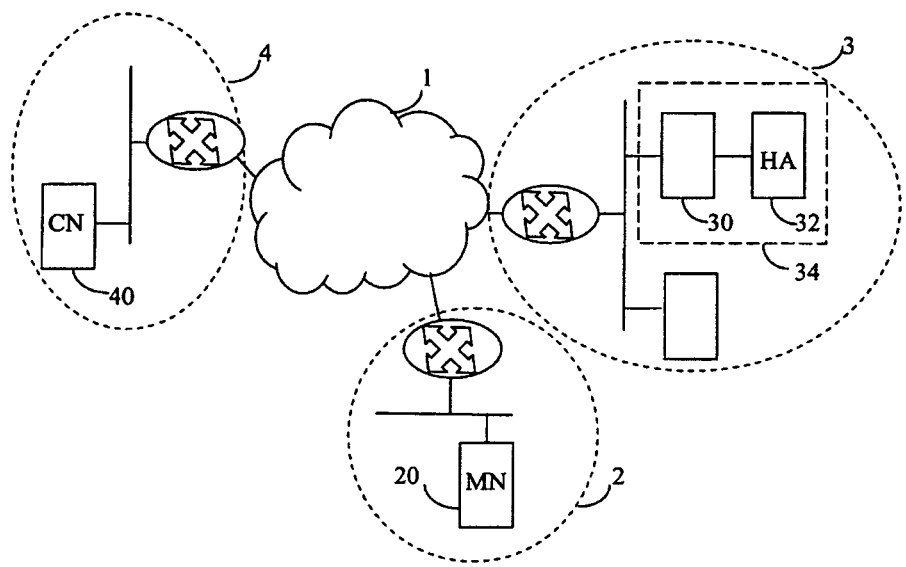
FIG. 1 represents a simplified diagram of communication networks in the context of implementing a mobility management service in accordance with one particular embodiment of the invention.
Figure 6:
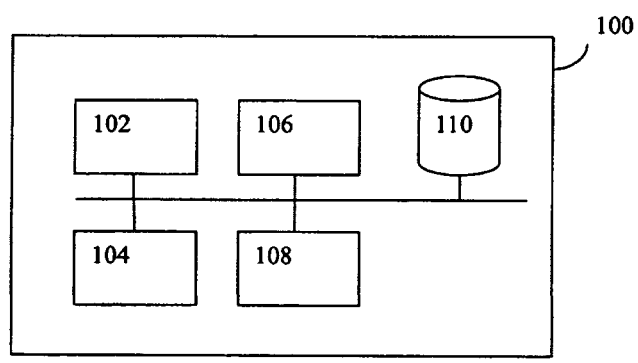
FIG. 6 represents a functional block diagram of an entity for filtering packets coming from a communication network for implementing the method of the invention.

FIG. 1 shows a packet-switched communication network 1 to which other communication networks 2, 3 and 4 are connected. The network 3 is referred to hereinafter as the home network. It comprises an entity 30 for filtering packets coming from the communication network 1 and a mobility management service platform 32, referred to hereinafter as the Home Agent (HA). The filtering entity 30 filters packets coming from the communication network 1 as a function of filtering rules defined and stored in a rules base 110, as shown in FIG. 6. The filtering entity 30 and the mobility management service platform 32 form a service provider system 34.

A terminal 20 belongs to the home network 3 and enjoys a mobility management service enabling it to change IP network. The terminal 20 can implement IP network mobility. This service is based on the Mobile IP protocol, defined primarily by the document RFC 3344 for IPv4 and by the document RFC 3775 for IPv6. To this end, the terminal 20 has a service identifier, and more specifically—for the mobility management service—a Network Access Identifier (NAI) as defined in RFC 2486. In FIG. 1, the terminal 20 is roaming and connected to the communication network 2, hereinafter referred to as the visited network, with visitor status. In order to benefit from the mobility management service, it is registered with the mobility management service platform 32. The registration procedure is described in detail hereinafter. Once registered, the roaming terminal 20 has an address in the home network 3 referred to as the Home Address (HoA) and a temporary address in the visited network 2 referred to as the Care-of-Address (CoA) if the Foreign Agent (FA) function exists or the Co-located Care-of-Address (CCoA) otherwise. To simplify the description, the situation referred to here is one in which the visited network 2 has no foreign agent FA. The roaming terminal 20 enters into communication with a Correspondent Node (CN) 40 in the communication network 4. Packets sent by the correspondent node 40 to the roaming terminal 20 are sent with the address HoA of the terminal in the home network 3 as their destination address. These packets are routed to the home agent, which reroutes them to the temporary address CCoA of the roaming terminal 20 in the visited network 2. Packets sent by the roaming terminal 20 to the correspondent node 40 are sent with the address HoA of the roaming terminal in the home network 3 as their packet source address.

To prevent packets transmitted by the roaming terminal 20 from the visited network 2 being rejected because of a home IP address, i.e. the address in the home network 3, considered to be incorrect in the visited network 2, a tunnel can be established between the roaming terminal 20 and the home agent 32. Packets transmitted by the roaming terminal 20 to the correspondent node 40 are then transmitted to the home agent HA 32 in the tunnel. The home agent HA 32 is then responsible for routing them to the correspondent node 40.

Figures 3, 4:
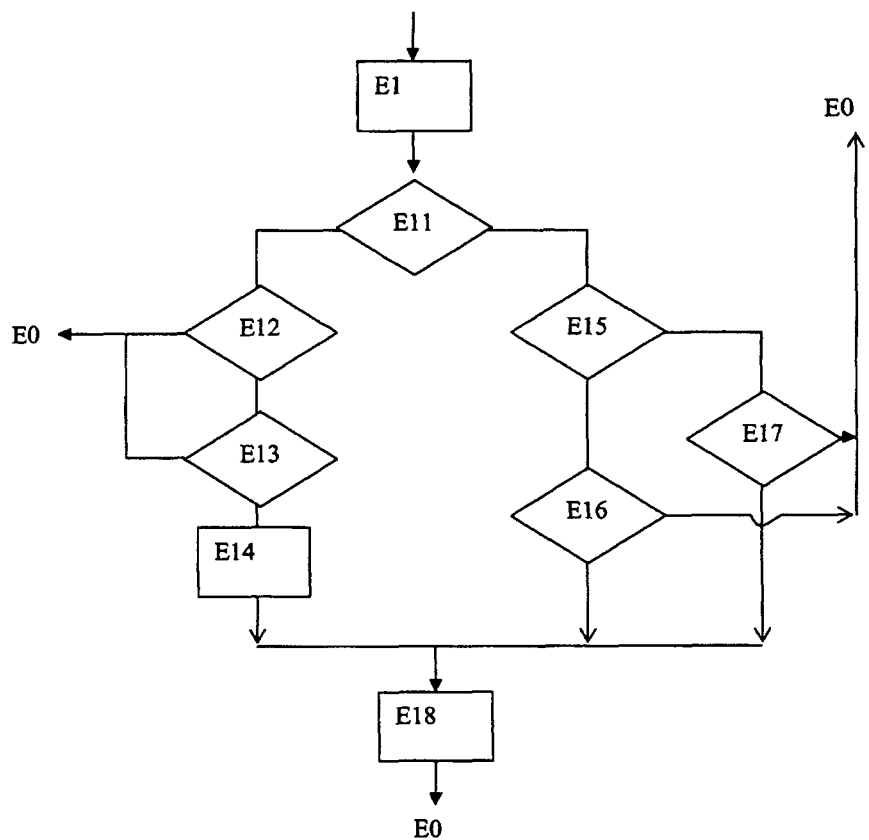
FIG. 3 represents a set of filtering rules in accordance with one particular embodiment of the invention.
FIG. 4 represents the steps of the method in accordance with one particular embodiment of the invention executed on reception of a packet from a communication network.

In a step of initialization of the filtering entity 30, a generic filtering rule R1 is defined, as shown in FIG. 3. This rule R1 aims to filter messages defined by a given protocol (Mobile IP) sent to the home agent 32, identified by its IP address (IP HA), in which protocol messages comprising an invalid Network Access Identifier NAI are blocked. A set of valid network access identifiers is defined in this way, identifying all terminals authorized to register with the home agent 32. To be more precise, the destination User Datagram Protocol (UDP) ports are also defined, of value 434 and 435 for the mobility management service, to which messages defined by the given protocol are liable to be sent. This filtering rule, referred to hereinafter as the generic filtering rule, is stored in the rules base 110. This rule has a reciprocal counterpart R1r which authorizes only messages defined by the given protocol sent by the home agent 32 to a valid network access identifier. Application of this reciprocal rule R1r does not contribute to protection of the home agent, however.

Figure 5:
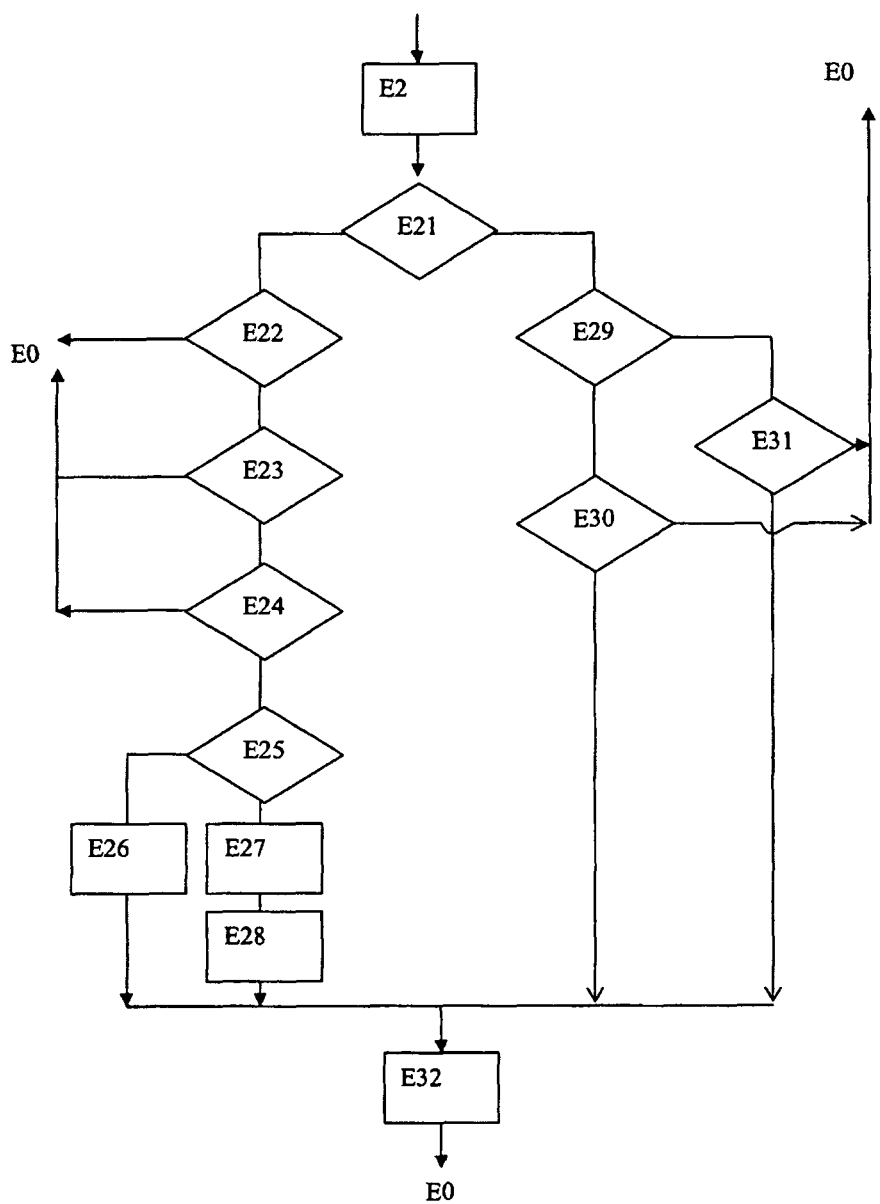
FIG. 5 represents the steps of the method in accordance with one particular embodiment of the invention executed on reception of a packet from a service platform.

The process then proceeds to a step E0, not shown in FIGS. 4 and 5, of awaiting reception of a packet coming from or going to the home agent 32.

The steps of the filtering process executed on reception of a packet from the communication network 1 are described next with reference to FIG. 4.

In a first step E1, a packet P is received from the communication network 1.

In a test step E11, it is verified if the packet P contains a message defined by a given protocol.

If so, it is verified in a step E12 if the criteria of the generic rule R1 are satisfied, i.e. that this is a message defined by the Mobile IP protocol sent to the IP address IP HA of the home agent 32, and of the UDP port 434 or 435, and that it comprises a network access identifier NAI from the set of valid network access identifiers, as defined in the rule R1. If at least one of the above criteria is not satisfied, the packet P is blocked and the process returns to the step E0, awaiting reception of a packet.

If all the criteria are satisfied, it is verified in a step E13 if this is a message in connection with registration with the home agent. If not, the packet P is blocked and the process returns to the step E0, awaiting reception of a packet.

If so, i.e. if the message is a registration message (Registration Request) for the mobility management service, there is associated with the roaming terminal 20, in a step E14, a temporary registration context comprising the network access identifier NAI and the temporary address CoA of the roaming terminal 20 in the visited network 2, extracted from the registration message.

Note that here "registration context" refers to information relating to the registration of the terminal with a service platform such as the mobility management service platform 32. A registration context is associated with a terminal, a service platform and specific registration of the terminal with the service platform. It comprises registration information transmitted between the terminal and the service platform during registration.

If the Registration Request message contains an address HoA of the roaming terminal 20 in the home network 3, that address HoA is stored in the temporary registration context. The process then proceeds to the step E18 of transmitting the packet to the home agent 32.

During the step E18, the packet is transmitted to the home agent 32 and the process returns to the step E0, awaiting reception of a packet coming from or going to the home agent 32.

If there is a negative result in the step E11, i.e. if the packet does not contain a message defined by a given protocol, the process then proceeds to a test step E15 described hereinafter.

Following the steps E1-E14 as described hereinabove, on reception of a packet P from the communication network, a packet that does not satisfy the criteria of the generic rule R1 has been filtered and a non-blocked packet comprising a registration message has been used to associate with the roaming terminal 20 a temporary registration context.

Finalization of the registration context, as carried out by the various steps of the process, is described next with reference to FIG. 5.

In a step E2, a packet P is received from the home agent 32.

In a test step E21, it is verified if the packet P contains a message defined by a given protocol.

If so, it is verified in a step E22 if the criteria of the reciprocal generic rule R1 are satisfied, i.e. it is verified that this is a message defined by the Mobile IP protocol coming from the IP address IP HA of the home agent 32 and the UDP port 434 or 435, and that it contains by way of destination a network access identifier NAI that is one of the set of valid network access identifiers, as defined in the rule R1r. If at least one of the criteria defined hereinabove is not satisfied, the packet P is blocked and the process returns to the step E0, awaiting reception of a packet.

If all the criteria are satisfied, it is verified in a step E23 if the message is a response to a registration request. If not, the packet P is blocked. It is verified if a temporary registration context exists and that context is eliminated if appropriate. The process returns to the step E0, awaiting reception of a packet.

If the message is a response to a registration request, it is verified in a step E24 if there is a temporary registration context 50 comprising the network access identifier NAI extracted from the response message to a registration request.

If no temporary registration context associated with the terminal and comprising the extracted network access identifier exists, the packet is blocked and the process returns to the step E0, awaiting reception of a packet.

If a temporary registration context 50 associated with the terminal and comprising the extracted network access identifier exists, it is verified in a step E25 if it is a successful response message (Registration Reply) comprising the value 0 or 1 in the Code field, for the mobility management service.

If the response is negative, i.e. if the Registration Reply message comprises a value other than 0 or 1 in the Code field, the temporary registration context associated with the terminal is deleted in a step E26, followed by a step E32 of transmitting the packet to the communication network 1.

Figure 2:
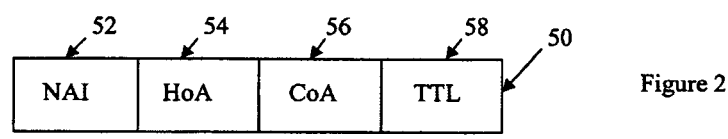
FIG. 2 represents a registration context associated with the mobility management service according to one embodiment of the invention.

If the response is positive, in a step E27 of associating a registration context 50 with the terminal, there is extracted from the response message to the registration request a registration Time-To-Live TTL that is stored in the registration context 50 associated with the terminal. If it is not already present in the registration context, the address HoA of the roaming terminal 20 in the home network 3, contained in the response message, is also stored. In some embodiments that limit the number of addresses in the home network 3 necessary for the service, the address HoA in the home network 3 is allocated by the home agent at the time of the response to a registration request. The registration context 50 is then definitively associated with the roaming terminal 20. It is represented in FIG. 2 and comprises:

a network access identifier (NAI) 52;
an address (HoA) 54 of the roaming terminal in the home network 3;
a temporary address (CoA) 56 of the roaming terminal 20 in the visited network 2;
a Time-To-Live (TTL) 58.

In a step E28, two specific rules R2 and R3 associated with the roaming terminal 20 are created, as shown in FIG. 3, having a time-to-live equal to that of the registration context 50.

The first specific rule R2 aims to authorize encapsulated packets containing a source address equal to the temporary address CoA of the roaming terminal 20 sent to the home agent 32 identified by its IP address IP HA. For example, the particular situation here is one in which the encapsulation mode is IPinIP. This encapsulation mode is defined during the registration phase. Other encapsulation modes are equally possible such as IPinUDP, GRE (Generic Routing Encapsulation), the IPinIP mode being the default mode.

A reciprocal rule R2r aims to authorize traffic in the opposite direction.

The second specific rule R3 aims to authorize packets sent from the address HoA of the roaming terminal 20 in the home network 3. A reciprocal rule R3r aims to authorize traffic in the opposite direction, i.e. traffic sent to the address HoA of the roaming terminal 20 in the home network 2.

The method then proceeds to the step E32 of transmitting the packet to the communication network 1.

During the step E32, the packet is transmitted to the communication network 1 and the process returns to the step E0, awaiting reception of a packet.

If there is a negative result in the step E21, i.e. if the packet does not contain a message defined by a given protocol, the next step E29 is a test described hereinafter.

Following the above steps, the rules base 110 comprises a generic rule R1 and one or more pairs of rules (R2, R3) with a limited time-to-live, associated with roaming terminals and registered successfully with the mobility management service.

The method also comprises a background task, not represented in FIGS. 4 and 5, the aim of which is to eliminate from the rules base 110 the specific rules R2, R3 whose time-to-live has expired.

The filtering steps as such, using pairs of rules (R2, R3) is described next, again with reference to FIGS. 4 and 5. The step E12 of filtering using the generic rule R1 has already been described.

Initially, in the step E11, if a packet received from the communication network 1 does not comprise any message defined by a given protocol, the next step E15 is a test.

In this step E15, it is verified if the packet corresponds to encapsulated data. If so, it is verified in a step E17:

if the destination address contained in the packet is equal to the IP address of the home agent 32, and if the source address contained in the packet is equal to a temporary address CoA of a rule R2 belonging to the set of valid rules R2.

If the packet is not for the home agent 32, it is blocked.

If there is no rule R2 such that the source address of the packet is equal to the temporary address CoA stored in the rule, the packet is blocked.

In both cases, the process returns to the step E0, awaiting reception of a packet.

If there is a rule R2 such that the source address of the packet is equal to a temporary address of a terminal registered with the home agent 32, the next step is the step E18, already described, of transmitting the packet to the home agent 32.

If in the step E15 the packet does not correspond to encapsulated data, it is verified in a step E16 if the source address contained in the packet is equal to an address HoA in the home network of a rule R3 belonging to the set of valid rules R3.

If there is no rule R3 such that the source address of the packet is equal to the address HoA in the home network, the packet is blocked and the process returns to the step E0, awaiting reception of a packet.

If there is a rule R3 such that the source address of the packet is equal to an address HoA in the home network of a terminal registered with the home agent 32, the process proceeds to the step E18, already described, of transmitting the packet to the home agent 32.

Back to step E21, if a packet received from the home agent 32 does not comprise a message defined by a given protocol, the next step E29 is a test.

These steps do not aim to protect the home agent 32, however, and are optional.

In this step E29, it is verified if the packet corresponds to IPinIP encapsulated data. If so, it is verified in a step E31:

if the source address contained in the packet is equal to the IP address of the home agent 32, and if the destination address contained in the packet is equal to a temporary address CoA of a rule R2r belonging to the set of valid rules R2r.

If the packet was not sent by the home agent 32, it is blocked.

If there is no rule R2r such that the destination address of the packet is equal to the temporary address CoA, the packet is blocked.

In both cases, the process returns to the step E0, awaiting reception of a packet.

If there is a rule R2r such that the destination address of the packet is equal to a temporary address of a terminal registered with the home agent 32, the process proceeds to the step E32, already described, of transmitting the packet to the communication network 1.

If in the step E29 the packet does not correspond to encapsulated data, it is verified in a step E30 if the destination address contained in the packet is equal to an address HoA in the home network of a rule R3r belonging to the set of valid rules R3r.

If there is no rule R3r such that the destination address of the packet is equal to the address HoA in the home network, the packet is blocked and the process returns to the step E0, awaiting reception of a packet.

If there is a rule R3r such that the destination address of the packet is equal to an address HoA in the home network of a terminal registered with the home agent 32, the process proceeds to the step E32, already described, of transmitting the packet to the communication network 1.

In a similar manner to that described for registering a roaming terminal 20, if the terminal sends a request to eliminate its registration and that request is accepted by the home agent 32, the registration context 50 associated with the terminal 20 is deleted and the corresponding specific rules are deleted from the rules base 110.

If the roaming terminal 20 sends a request to renew its registration that fails, the registration context 50 associated with the terminal 20 is deleted and the corresponding specific rules are deleted from the rules base 110.

FIG. 6 represents a functional block diagram of an entity 100 for filtering packets coming from a communication network for implementing one particular embodiment of the method.

Intended to protect a service platform 32, the entity 100 for filtering packets coming from a communication network comprises:

a rules base 110 storing filtering rules;

a communication module 102 adapted to receive packets coming from the communication network 1 or from the service platform 32 and to send packets to the communication network 1 or the service platform 32;

a module 104 for associating a registration context with a terminal, following successful registration of the terminal with the service platform 32, the context comprising registration information transmitted between the terminal and the service platform during registration;

a module 106 for creating at least one filtering rule from the registration context, said rule aiming to block packets that do not conform to at least some of the registration information;

a module 108 for filtering packets as a function of the rule(s) created.

The packet filtering module 108 is optionally also adapted to block messages defined by a given protocol sent to the service platform that comprise an invalid service identifier.

The modules 104, 106 and 108 are adapted to execute the method described above. They are preferably software modules comprising software instructions for executing the steps of the method described above executed by the filtering entity. The invention therefore relates also to:

a program for an entity for filtering packets coming from a communication network, comprising program code instructions for commanding execution of the steps of the method when the program is executed by the entity, and a storage medium readable by an entity on which the program for a packet filtering entity is stored.

The software modules can be stored in or transmitted by a data medium. This can be a hardware storage medium, for example a CD-ROM, a magnetic diskette or a hard disk, or a transmission medium such as an electrical, optical or radio signal, or a telecommunication network.

The invention also relates to a service provider system 34 comprising:

a service platform 32 adapted to provide a service to terminals of a home network, and a filtering entity 30 as defined hereinabove, adapted to receive packets coming from a communication network and to filter them before transfer to the service platform.

The method has been described in the particular case where the visited network 2 does not include any foreign agent FA. It can easily be transposed to the case where the visited network 2 includes a foreign agent FA.

The method has been described in the particular case of protecting an IP terminal mobility management service platform. It is equally applicable to other services, such as the provision of multimedia services, authentication services.

For example, to provide an IMS (IP Multimedia Subsystem) type multimedia service, the generic rule R1 blocks SIP-Register registration requests in respect of the service in which the terminal is not identified by a valid SIP URI (Uniform Resource Identifier) service identifier, as defined in RFC 2396. One specific rule then blocks packets that do not come from a source IP address of a registered terminal. The SIP-Register message includes a Contact field containing the source IP address of the terminal and a time-to-live of the registration.

Again by way of example, for an IEEE 802.1x EAP (Extensible Authentication Protocol) type authentication service such as EAP-SIM (EAP Subscriber Identity Module) and EAP-AKA (EAP Authentication and Key Agreement), the terminal is identified by an NAI type service identifier, based on the user's IMSI (International Mobile Subscriber Identity). That identifier is exchanged during the first EAP authentication phase. The EAP phase ends with the reception of an EAP Success message in the case of success or an EAP Failure message in the case of failure. A generic rule can therefore also be defined based on the service identifier. In the case of successful authentication, the IP address of the user is obtained by DHCP, as well as a time-to-live (Lease Time DHCP). A specific filtering rule can therefore be defined aiming to block packets that are not sent from an authenticated user IP address.

What is claimed is:

1. A method of filtering packets sent to a communication network from a home network, the method comprising, after successful registration of a terminal with a service platform:

a step of associating a registration context with the terminal, the context comprising registration information transmitted between the terminal and the service platform during registration;

a step of creating at least one filtering rule on the basis of the registration context, said rule aiming to block packets sent from the home network to the communications network that do not conform to at least a portion of the registration information; and a step of filtering the packets as a function of the rule created, wherein the service platform manages the mobility of at least one terminal belonging to the home network to visited networks and the registration context includes an address of the terminal in the home network, said step of creating a filtering rule being adapted to create at least one rule to block all outgoing packets not sent from one of the address of the terminal in the home network and the address of a home agent, while passing all outgoing packets sent from the address of the terminal in the home network and all outgoing packets sent from the address of the home agent.

2. The filtering method as claimed in claim 1, further comprising, before the step of filtering packets as a function of the rule created, a filtering step in which messages defined by a given protocol comprising an invalid service identifier sent to the service platform are blocked.

3. The filtering method as claimed in claim 1, wherein, a time-to-live associated with the registration with the service platform is associated with the filtering rule created, after which said rule is eliminated.

4. The filtering method as claimed in claim 1, wherein, the registration context further comprising a temporary address of the terminal in a visited network, another filtering rule is created on the basis of the registration context, said other rule being adapted to block encapsulated packets not including the temporary address of the terminal by way of a home address.

5. An entity for filtering packets sent to a communication network from a home network, the entity comprising:
- means for associating a registration context with a terminal, following successful registration of the terminal with the service platform, the context comprising registration information transmitted between the terminal and the service platform during registration;
- means for creating at least one filtering rule on the basis of the registration context, said rule aiming to block packets sent from the home network to the communications network that do not conform to at least a portion of the registration information; and
- means for filtering the packets as a function of the rules created,
- wherein the service platform manages the mobility of at least one terminal belonging to the home network to visited networks and the registration context includes an address of the terminal in the home network, said means for creating at least one filtering rule being adapted to create at least one rule for blocking all outgoing packets not sent from one of the address of the terminal in the home network and the address of a home agent, while passing all outgoing packets sent from the address of the terminal in the home network and all outgoing packets sent from the address of the home agent.

6. A service provider system comprising:
- a service platform adapted to provide a service to terminals of a home network, and
- a filtering entity as claimed in claim 5, adapted to receive packets coming from a communication network and to filter them before transfer to the service platform.

7. A non-transitory computer-readable storage medium storing program instructions for causing a processor to execute the method of claim 1.

* * * * *